United States Patent
Mahrla

(10) Patent No.: US 7,245,167 B2
(45) Date of Patent: Jul. 17, 2007

(54) CLOCK REGULATION APPARATUS AND CIRCUIT ARRANGEMENT

(75) Inventor: Peter Mahrla, Zorneding (DE)

(73) Assignee: Infineon Technologies AG (DE)

( * ) Notice: Subject to any disclaimer, the term of this patent is extended or adjusted under 35 U.S.C. 154(b) by 0 days.

(21) Appl. No.: 10/989,600

(22) Filed: Nov. 16, 2004

(65) Prior Publication Data
US 2005/0110545 A1    May 26, 2005

(30) Foreign Application Priority Data
Nov. 20, 2003 (DE) ............... 103 54 215

(51) Int. Cl.
*H03K 3/00*    (2006.01)
(52) U.S. Cl. .......... 327/291; 327/27; 327/37; 327/298; 327/299
(58) Field of Classification Search ............ None
See application file for complete search history.

(56) References Cited

U.S. PATENT DOCUMENTS 5,192,914 A * 3/1993 Sudo et al. ............. 327/34
6,675,301 B1   1/2004 Kurosawa
6,686,782 B2 * 2/2004 Kinoshita et al. ............ 327/143

FOREIGN PATENT DOCUMENTS

| DE | 695 22 595 T2 | 7/2002 |
| JP | 7-264874 A | 10/1995 |
| JP | 2001-125690 | 5/2001 |
| WO | WO-00/26747 A1 | 5/2000 |

* cited by examiner

*Primary Examiner*—Kenneth B. Wells
*Assistant Examiner*—An T. Luu
(74) *Attorney, Agent, or Firm*—Dickstein, Shapiro, LLP.

(57) ABSTRACT

Clock regulation apparatus for preventing a logic switching mechanism from operating incorrectly. The apparatus has a supply voltage input that receives a supply voltage, which is also applied to the logic switching mechanism, a comparison unit that outputs an error signal if the supply voltage value drops below a reference value, a clock signal input that receives a clock signal from a clock generator, and a clock suppression unit, which is coupled to the clock signal input and to the comparison unit, that has a clock output for outputting the clock signal and that suppresses or delays the clock signal for a duration of at least one clock period if the error signal exists.

20 Claims, 3 Drawing Sheets

CLOCK REGULATION APPARATUS AND CIRCUIT ARRANGEMENT

CROSS-REFERENCE TO RELATED APPLICATION

This application claims priority to German Patent Application Serial No. 10354215.9, filed Nov. 20, 2003, and is incorporated herein by reference in its entirety.

FIELD OF THE INVENTION

The present invention relates to a clock regulation apparatus for preventing a logic switching mechanism from behaving incorrectly and to a circuit arrangement having a logic switching mechanism and having at least one clock regulation apparatus.

BACKGROUND OF THE INVENTION

In complex logic switching mechanisms such as those used in integrated circuits, for example, the current drawn is subject to severe fluctuations. The reason for this is, inter alia, that in phases when the logic switching mechanism is inactive the clock signal is supplied only to such parts of the logic switching mechanism as are necessary for subsequently reactivating the operation of the logic switching mechanism. In the reactivation phase, the current drawn by the logic switching mechanism rises greatly within a few clock periods.

Such a rise in current causes a supply voltage drop in the entire logic switching mechanism through the inductive and resistive coating of the electrical power supply on a component which comprises the logic switching mechanism, in the housing of the component, on a board which comprises the component, as far as a blocking capacitance on the power supply source.

If the supply voltage drops below a minimum permissible limit value, this may result in incorrect behavior or in operating failure of the logic switching mechanism. In particular, a combinational logic unit in the logic switching mechanism may require a long period of time in order to reach a stable operating state. When the supply voltage has dropped, the subsequent clock signal may transfer incorrect logic values into the logic switching mechanism. These result in an impermissible state of the combinational logic and subsequently in incorrect behavior from the logic switching mechanism. Such incorrect behavior can be terminated only by resetting the logic switching mechanism to an initial state. Operation of the associated component is thus temporarily unavailable.

To avoid a drop in the supply voltage in the course of various operating conditions, it is known practice for the voltage supply to be designed on a redundant basis. This is done using an additional capacitor whose capacitance is designed for the small timescales within an integrated component. This means that an additional area is required on the semiconductor component, which results in increased production costs.

JP2001125690-A has disclosed an apparatus which lowers the clock frequency of a microprocessor in the event of the supply voltage dropping. To this end, a measuring apparatus is provided which detects when the supply voltage drops below a reference value and then terminates supply of the clock signal. The microprocessor is supplied with a further clock signal having a low clock frequency from an internal clock source. As JP07264874-A also provides, this requires the microprocessor to be reset to an initial state. The two apparatuses are used to provide a clock source which outputs a clock signal having different clock frequencies. Such clock sources deliver an inaccurate clock signal during a transient period.

WO 00/26747-A1 describes a method and an apparatus for restricting the power consumption in a microprocessor. The microprocessor's power consumption is observed and a clock frequency and the microprocessor's supply voltage are regulated accordingly, so that the microprocessor's power consumption is below a prescribed limit value. The logic switching mechanism is not prevented from behaving incorrectly. In addition, they have the associated drawback that it is necessary to provide a clock source having a variably adjustable clock frequency.

SUMMARY OF THE INVENTION

The present invention is based on the problem of providing a clock regulation apparatus for preventing a logic switching mechanism from behaving incorrectly and also a circuit arrangement in which the combinational logic is prevented from behaving incorrectly on account of a dip in the supply voltage, and the logic switching mechanism is supplied with a stable clock signal.

The clock regulation apparatus for preventing a logic switching mechanism from behaving incorrectly has
- a supply voltage input for receiving a supply voltage which is applied to the logic switching mechanism,
- a comparison unit which is set up such that it outputs an error signal if the supply voltage value drops below a reference value,
- a clock signal input for receiving a clock signal from a clock generator, and
- a clock suppression unit which is coupled to the clock generator and to the comparison unit, has a clock output for outputting the clock signal and suppresses or delays the clock signal for the duration of at least one clock period if the error signal exists.

The clock generator is set up such that it generates a clock signal having a prescribed frequency. The clock generator does not need to lock onto various clock frequencies repeatedly. Depending on the voltage received by the logic switching mechanism, the clock signal is suppressed, which means that a clock signal having a low frequency is made available to the logic switching mechanism in the short term. The advantage of this clock regulation apparatus is that the clock signal is always delivered to the logic switching mechanism, and the clock generator generates a stable clock signal.

The supply voltage applied to the logic switching mechanism may be measured in different regions of the logic switching mechanism. As a result, it is monitored locally in the logic switching mechanism or in the associated semiconductor component. Monitoring is preferably performed at critical points, such as at line nodes in the voltage supply in the integrated component. If the comparison unit detects that the supply voltage has dipped below a permissible value, a subsequent clock pulse is suppressed or alternatively is delayed. If a clock pulse is suppressed, the combinational logic in the logic switching mechanism has two clock periods' time to reach a stable state. This applies particularly in the case of logic switching mechanisms which are clocked by a rising clock edge.

Any delay in the timing of the data signals in the combinational logic is in most cases uncritical, since only very few clock edges are suppressed or delayed. Alternatively, allowances may be made for the delay using suitable lead times in the logic switching mechanism. Functional units or else decision parts of the logic switching mechanism which have real-time criticality, such as timers, may be excepted from this clock edge suppression.

One particular advantage is provided by the suppression of a single clock pulse. In contrast to general lowering of the clock frequency, omitting one clock pulse impairs the performance of the combinational logic insignificantly.

In a first embodiment of the clock regulation apparatus, it has a reference voltage input which is coupled to the comparison unit, and the comparison unit is set up such that it outputs an error signal if the supply voltage value drops below a value for a reference voltage.

To this end, the comparison unit may have a voltage comparator. If the supply voltage drops below the reference voltage, the comparator output delivers an error signal. In logic switching mechanisms which operate using an active clock edge, this active clock edge is used to evaluate the output of the comparator. If an error signal is detected, the subsequent active clock edge is suppressed by a suitable combinational logic unit. The next passive clock edge is admitted again.

The use of a reference voltage has the advantage that it is possible to stipulate from the outset the value to which the supply voltage can drop without the operation of the logic switching mechanism being impaired. This reference voltage can also be aligned dynamically.

In a second embodiment, the comparison unit has a reference switching mechanism containing combinational logic, the comparison unit being set up such that it outputs an error signal if a propagation time for a reference signal through the reference switching mechanism is greater than a prescribed reference propagation time.

In this case, the reference switching mechanism is supplied with the supply voltage ascertained from the logic switching mechanism. Any delay in the signal propagation in the reference switching mechanism corresponds to a drop in the supply voltage in the logic switching mechanism. If the delay in the reference switching mechanism exceeds the reference propagation time by half a clock period, for example, or else by a lower or higher value, this is a trigger for suppressing at least one clock period.

The advantage of this reference switching mechanism is that influences such as temperature and production variations in the logic switching mechanism are also taken into account when incorrect behavior is ascertained.

In one development, the clock suppression unit suppresses the clock signal for every at least second clock period on the basis of the error signal.

The advantage of this development is that the clock signal is made available to the logic switching mechanism for the duration of a plurality of clock periods at a lower clock frequency. In this case, the reduced clock frequency may be set as any whole multiple of the clock frequency of the clock signal generated in the clock generator.

Operation of the logic switching mechanism at a reduced clock frequency requires a very low supply voltage. This restores correct operation of the logic switching mechanism.

In a further development, the comparison unit is actuated using an operating clock signal, and the clock frequency of the operating clock signal is higher than the clock frequency of the clock signal.

This advantageously permits ascertainment of the supply voltage in the logic switching mechanism at a higher clock frequency. In a logic switching mechanism in which data are transferred only upon an active clock edge, the supply voltage may be evaluated using the active clock edge and an inactive clock edge. The timing in the logic switching mechanism and a possible transient time for the comparison unit are compensated for in this manner. In addition, the maximum dip in the supply voltage regularly occurs just after the active clock edge. If a dip is detected upon the inactive clock edge, the subsequent active clock edge can be suppressed.

A circuit arrangement has a logic switching mechanism, and a least one clock regulation apparatus, the clock regulation apparatus having a supply voltage input for receiving a supply voltage which is applied to the logic switching mechanism, a comparison unit which is set up such that it outputs an error signal if the supply voltage drops below a reference value, a clock signal input for receiving a clock signal from a clock generator, and a clock suppression unit which is coupled to the clock generator and to the comparison unit, has a clock output for outputting the clock signal and suppresses or delays the clock signal for the duration of at least one clock period if the error signal exists, and where at least one functional unit in the logic switching mechanism is coupled to the clock output of the clock regulation apparatus.

In this case, the circuit arrangement may be arranged in a single integrated component. However, it is likewise possible to integrate the logic switching mechanism in a component which is separate from the other apparatuses. Alternative embodiments of the circuit arrangement in separate components are likewise conceivable.

The clock generator generates a clock signal having a fixed or variably adjustable frequency. Particularly in the case of circuit arrangements in mobile appliances, it may be necessary to operate the logic switching mechanism at different clock frequencies, according to the mode of operation. Hence, the mobile appliance may be operated in an idle mode or in an active mode, in order to reduce the power consumption.

In one refinement of the circuit arrangement, the supply voltage input is coupled to a measurement point in the logic switching mechanism.

The advantage in this case is that the supply voltage is ascertained at a measurement point at which possible incorrect behavior by the logic switching mechanism arises.

In a further refinement, the circuit arrangement has at least one date storage for storing the error signal.

The data storage may be arranged in the circuit arrangement or separately. In one alternative, there is an interface to an external data storage, which means that incorrect behavior can be analyzed if required.

This means that it is possible to observe the activation of the error signal. The error signal may optionally be routed as an error diagnosis signal to an output on the component, may be stored in a memory component, for example together with an associated time information item, or may initiate an interrupt function in a microprocessor, the incorrect behavior being logged in a memory and being made available for subsequent analysis.

The error signal may provide a microprocessor program with the opportunity to take measures to compensate for the loss of time resulting from the clock suppression. In addition, the analysis of the error signal makes it possible to identify weaknesses in the design of the component and to improve the reliability of the circuit by changing the design as appropriate.

One development of the circuit arrangement contains at least one first functional unit and a second functional unit which is independent thereof,
  a first clock regulation apparatus which is coupled to the first functional unit, and
  a second clock regulation apparatus which is coupled to the second functional unit.

Complex switching mechanisms such as are used in digital components for communication appliances, for example, frequently comprise a plurality of mutually independent functional units. Such functional units perform tasks in digital signal processing and are designed as a DSP or microprocessor, for example. A component may thus have a plurality of independent microprocessors. A simultaneous rise in the supply current in a plurality of functional units is not out of the question in such switching mechanisms. Since the likelihood of a simultaneous rise in the supply current coinciding is low, the switching mechanism seldom behaves incorrectly. With systematic analysis, it is difficult to identify and eliminate such incorrect behavior.

The development advantageously allows a voltage drop to be identified in the first functional unit independently of the second functional unit. Changing the clock frequency in just the first functional unit or the second functional unit restricts the operation of the entire component only to the extent necessary to prevent the combinational logic from behaving incorrectly.

The provision of an error signal by the first clock regulation apparatus or the second clock regulation apparatus additionally makes it possible to establish which functional unit in the switching mechanism is causing incorrect behavior when there is a drop in voltage.

Advantageously, the reference value for the first clock regulation apparatus may also be chosen differently than the reference value for the second clock regulation apparatus. The reference value can be matched to the properties or requirements of the respective corresponding functional unit.

In an additional development of the circuit arrangement, the clock generator in the first clock regulation apparatus is coupled to the second clock regulation apparatus.

Advantageously, it is therefore necessary to provide only one clock generator which generates a stable clock signal.

In a further refinement of the circuit arrangement, it has an operating controller for the clock regulation apparatus, the clock generator being set up such that it takes a control signal as a basis for generating clock signals having at least two different clock frequencies, and the operating controller is set up such that the clock regulation apparatus is operated only if the clock frequency provided by the clock generator is greater than a reference frequency.

The selective operation of the clock regulation apparatus reduces the current drawn by the circuit arrangement, which is a significant advantage, particularly in mobile appliances.

BRIEF DESCRIPTION OF THE DRAWINGS

The invention is explained in more detail below using exemplary embodiments with reference to the drawing, in which.

DETAILED DESCRIPTION OF PREFERRED EMBODIMENTS OF THE INVENTION

Figure 1:
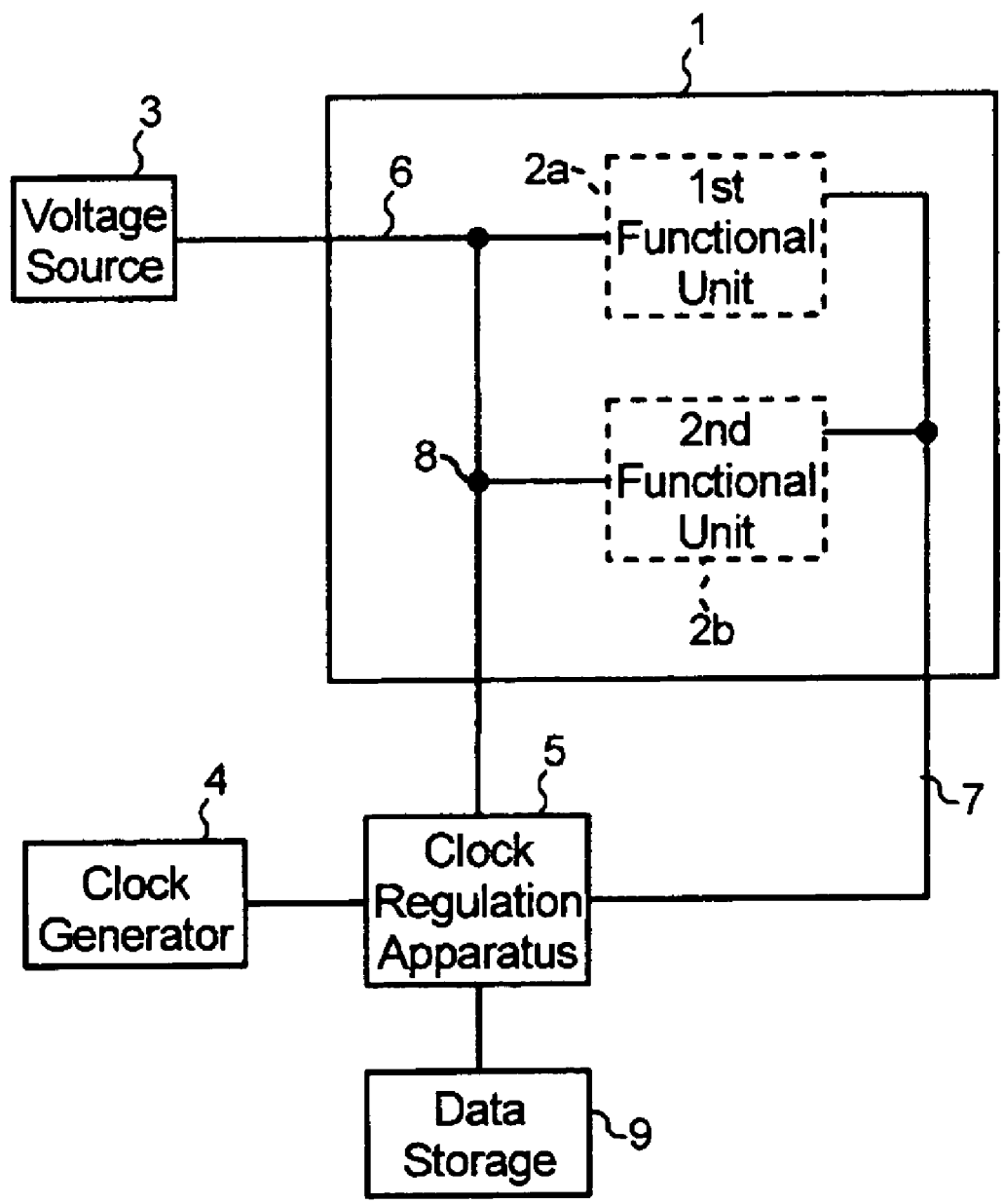
FIG. 1 shows a circuit arrangement based on the invention.

FIG. 1 shows a circuit arrangement in which a logic switching mechanism 1 is coupled to a voltage source 3. The voltage source 3 uses a supply line 6 to provide a first functional unit 2a (shown in dashes) and a second functional unit 2b (shown in dashes) with a supply voltage. In complex logic switching mechanisms 1, it is likewise conceivable for different functional units 2a, 2b to have different voltage supplies.

A clock signal is supplied from a clock generator 4 to the first functional unit 2a and to the second functional unit 2b via a clock regulation apparatus 5 and via a clock tree 7. The clock regulation apparatus 5 is coupled to a measurement node 8 in the supply line 6 in the logic switching mechanism 1. As a result, the supply voltage present on the measurement node 8 is supplied to the clock regulation apparatus 5. On the basis of this ascertained supply voltage, the clock regulation apparatus 5 suppresses the clock pulses obtained from the clock generator 4 or allows them to reach the clock tree 7.

The clock regulation apparatus 5 is coupled to a data storage 9. The data storage 9 is used by the clock regulation apparatus 5 to store an error signal, for example together with a time information item, when the clock regulation apparatus 5 detects a drop in the supply voltage on the measurement node 8 below a predefined reference value.

The embodiment of the invention which is shown in FIG. 1 has a single clock regulation apparatus 5. It is likewise conceivable for the circuit arrangement to have a plurality of clock regulation apparatuses 5 which supply a clock signal to a respective one of the functional units 2a or 2b via a separate clock tree 7, the clock suppression being controlled in line with the measurement of the supply voltage on the respective functional unit 2a, 2b.

In this case, the clock regulation apparatuses 5 may be implemented independently of one another in any one of the embodiments shown below.

Figure 2:
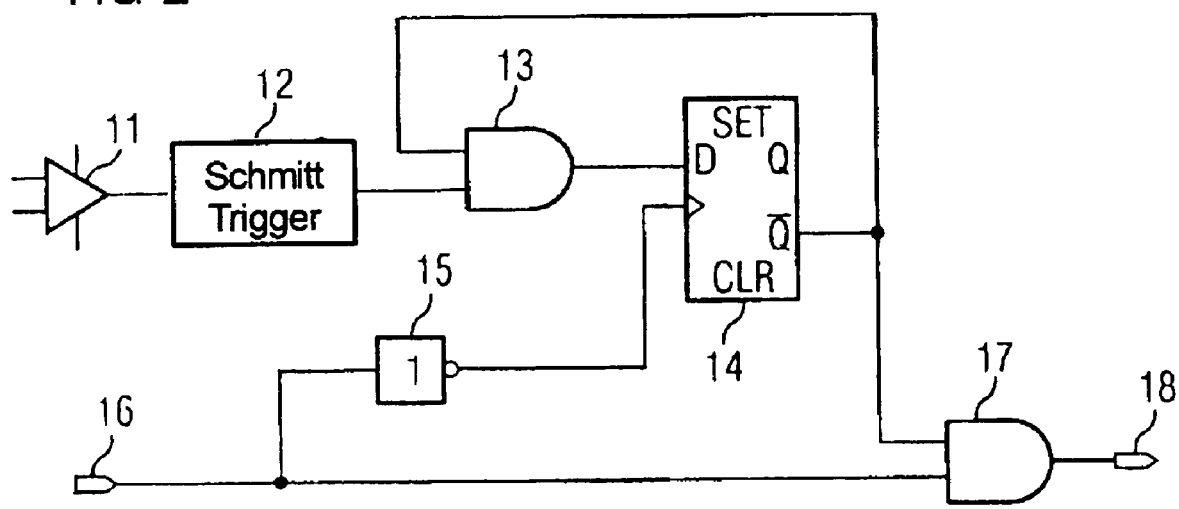
FIG. 2 shows a clock regulation apparatus based on a first embodiment of the present invention.

FIG. 2 shows a first embodiment of the clock regulation apparatus 5 in FIG. 1. A comparator 11 compares a supply voltage ascertained in the logic switching mechanism 1 with a constant reference voltage. If the value of the supply voltage drops below the reference voltage, the comparator 11 uses a signal to trigger an error signal at a Schmitt trigger 12.

The error signal is routed to a first input on a first AND gate 13. The output signal from the first AND gate 13 is supplied to a D connection on a D-type flip-flop 14. The $\overline{Q}$ signal at the inverting output of the D-type flip-flop 14 is routed back to a second input on the first AND gate 13 and to a first input on a second AND gate 17. An input clock signal generated in a clock generator is made available to the clock regulation apparatus via a clock input 16, the input clock signal being supplied to a clock input on the D-type flip-flop 14 via an inverter 15. In addition, the input clock signal is routed from the clock input to a second input on the second AND gate 17. The output of the second AND gate 17 is connected to a clock output 18 at which a regulated clock signal is provided.

Figure 2A:
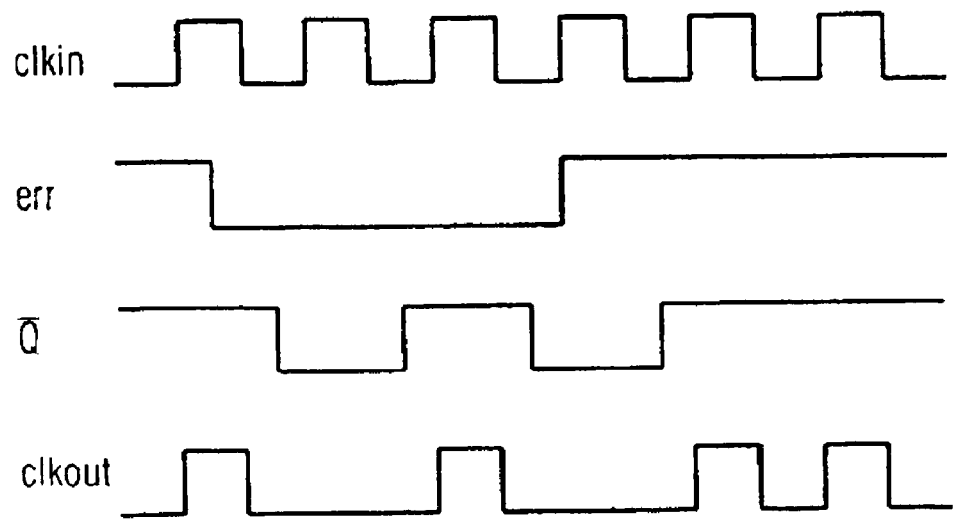
FIG. 2a shows synchronous signal profiles in the clock regulation apparatus shown in FIG. 2.

FIG. 2a shows, from top to bottom, four synchronous signal profiles for the clock signal clkin at the clock input 16, for the error signal err at the Schmitt trigger 12, for the $\overline{Q}$ signal at the inverting output of the D-type flip-flop, and for a regulated clock signal clkout at the clock output 18.

If the Schmitt trigger 12 indicates an error signal err provided by the comparator 11, this provides an oscillating $\overline{Q}$ signal at the inverting output of the D-type flip-flop 14. The $\overline{Q}$ signal corresponds to a suppression signal which uses the second AND gate 17 to suppress every second clock pulse of the clock signal.

Figure 3:
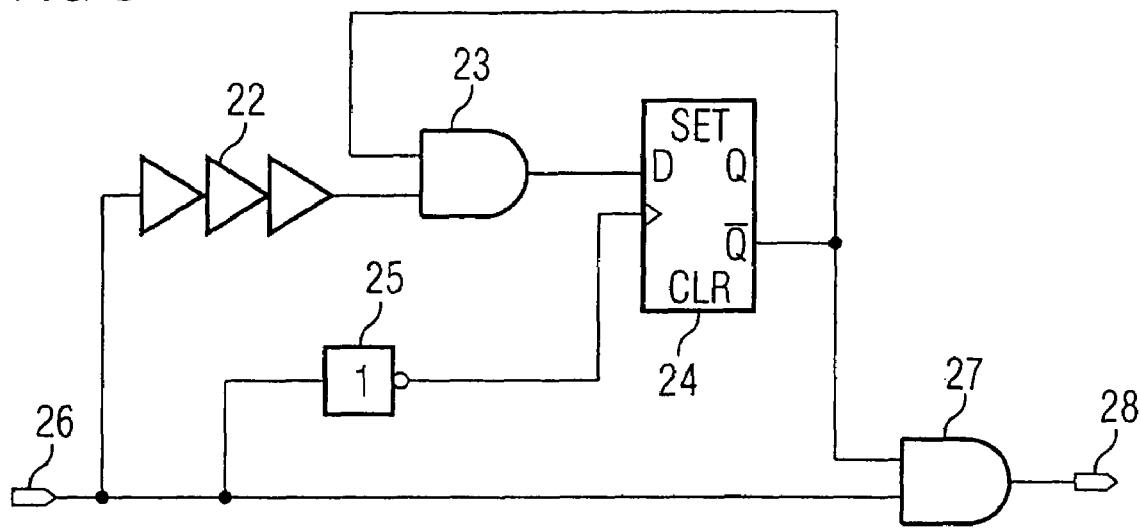
FIG. 3 shows a clock regulation apparatus based on a second embodiment of the present invention.

FIG. 3 shows a second embodiment of the clock regulation apparatus 5 in FIG. 1. A reference switching mechanism 22 receives, via a first clock input 26, an input clock signal which is generated in a clock generator. The reference switching mechanism 22 is operated at a supply voltage which is tapped off in the logic switching mechanism. An output on the reference switching mechanism is connected to a first input on a first AND gate 23. The first AND gate 23 supplies a signal to a D input on a D-type flip-flop 24. A $\overline{Q}$ signal is supplied from an inverting output on the D-type flip-flop 24 both to a second input on the first AND gate 23 and to a first input on a second AND gate 27.

The input clock signal is additionally supplied to the clock input of the D-type flip-flop 24 via an inverter 25. The input clock signal is also supplied to a second input on the second AND gate 27. The output of the second AND gate 27 is connected to a clock output 28. The clock output 28 provides a regulated clock signal for functional units in the logic switching mechanism.

Figure 3A:
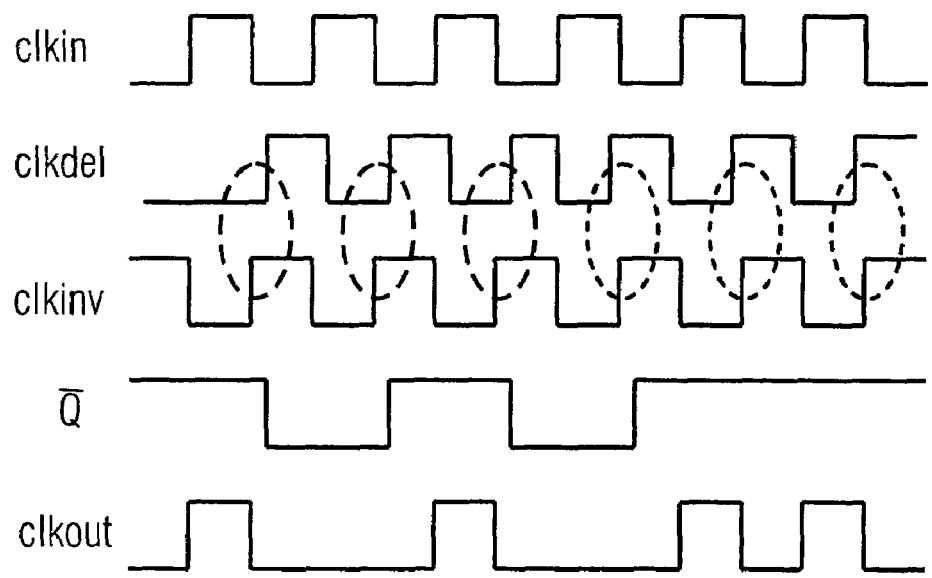
FIG. 3a shows synchronous signal profiles in the clock regulation apparatus shown in FIG. 3.

FIG. 3a shows five synchronous signal profiles for an input clock signal clkin, for a delayed clock signal clkdel at the output of the reference switching mechanism 22, and for the inverted clock signal clkinv at an output on the inverter 25, and finally the $\overline{Q}$ signal at the inverting output of the D-type flip-flop 24 is shown and a regulated clock signal clkout at the clock output 28.

The inverted clock signal clkinv at the output of the inverter 25 represents a clock signal which is shifted through half a clock period, the clock signal being compared with the delayed clock signal clkdel in the D-type flip-flop 24. Should the delayed clock signal clkdel lead the inverted clock signal clkinv, then the D-type flip-flop 24 uses the $\overline{Q}$ signal to output a suppression signal which uses the second AND gate 27 to suppress every second clock pulse of the input clock signal. The clock frequency of the regulated clock signal is thereby halved in comparison with the clock frequency of the input clock signal.

What is claimed is:

1. A clock regulation apparatus for preventing a logic switching mechanism from operating incorrectly, comprising:
   a supply voltage input that receives a supply voltage, which is also applied to the logic switching mechanism;
   a comparison unit that outputs an error signal if the supply voltage value drops below a reference value, wherein the comparison unit has a reference switching mechanism containing combinational logic, and outputs an error signal if a propagation time for a test signal through the reference switching mechanism is greater than a prescribed reference propagation time;
   a clock signal input that receives a clock signal from a clock generator; and
   a clock suppression unit, which is coupled to the clock signal input and to the comparison unit, that has a clock output for outputting the clock signal and that suppresses or delays the clock signal for a duration of at least one clock period if the error signal exists.

2. The clock regulation apparatus as claimed in claim 1, further comprising a reference voltage input, which is coupled to the comparison unit,
   wherein the comparison unit outputs an error signal if the supply voltage value drops below a value for a reference voltage.

3. The clock regulation apparatus as claimed in claim 1, wherein the clock suppression unit suppresses the clock signal for every, at least second clock period on a basis of the error signal.

4. The clock regulation apparatus as claimed in claim 1, wherein the comparison unit is actuated using an operating clock signal, and the clock frequency of the operating clock signal is higher than the clock frequency of the clock signal.

5. A circuit arrangement comprising:
   a logic switching mechanism; and
   at least one clock regulation apparatus comprising:
      a supply voltage input that receives a supply voltage, which is also applied to the logic switching mechanism, wherein the supply voltage input is coupled to a measurement point in the logic switching mechanism;
      a comparison unit that outputs an error signal if the supply voltage drops below a reference value;
      a clock signal input that receives a clock signal from a clock generator; and
      a clock suppression unit, which is coupled to the clock signal input and to the comparison unit, that has a clock output for outputting the clock signal and that suppresses or delays the clock signal for a duration of at least one clock period if the error signal exists,
   wherein at least one functional unit in the logic switching mechanism is coupled to the clock output of the clock regulation apparatus.

6. The circuit arrangement as claimed in claim 5, further comprising at least one data storage that stores the error signal.

7. The circuit arrangement as claimed in claim 5, further comprising at least one first functional unit and a second functional unit, which is independent of the first functional unit,
   wherein a first clock regulation apparatus of the at least one clock regulation apparatus is coupled to the first functional unit, and a second clock regulation apparatus of the at least one clock regulation apparatus is coupled to the second functional unit.

8. The circuit arrangement as claimed in claim 7, wherein the clock generator is coupled to the second clock regulation apparatus.

9. The circuit arrangement as claimed in claim 5, further comprising an operating controller for the clock regulation apparatus, wherein the clock generator uses a control signal as a basis for generating clock signals having at least two different clock frequencies, and the clock regulation apparatus is operated only if the clock frequency provided by the clock generator is greater than a reference frequency.

10. The circuit arrangement as claimed in claim 5, wherein the clock suppression unit suppresses the clock signal for every, at least second clock period on a basis of the error signal.

11. A clock regulation apparatus for preventing a logic switching mechanism from operating incorrectly, comprising:
   a supply voltage input means for receiving a supply voltage, which is applied to the logic switching mechanism;

a comparison means for outputting an error signal if the supply voltage value drops below a reference value, wherein the comparison means has a reference switching means containing combinational logic, and outputs an error signal if a propagation time for a test signal through the reference switching means is greater than a prescribed reference propagation time;

a clock signal input means that receives a clock signal from a clock generating means; and a clock suppression means, which is coupled to the clock generating means and to the comparison means, that has a clock output means for outputting the clock signal, for suppressing or delaying the clock signal for a duration of at least one clock period if the error signal exists.

12. The clock regulation apparatus as claimed in claim 11, further comprising a reference voltage input means, which is coupled to the comparison means, wherein the comparison means outputs an error signal if the supply voltage value drops below a value for a reference voltage.

13. The clock regulation apparatus as claimed in claim 11, wherein the clock suppression means suppresses the clock signal for every, at least second clock period on a basis of the error signal.

14. The clock regulation apparatus as claimed in claim 11, wherein the comparison means is actuated using an operating clock signal, and the clock frequency of the operating clock signal is higher than the clock frequency of the clock signal.

15. A circuit arrangement comprising:
a logic switching means; and
at least one clock regulation apparatus comprising:
  a supply voltage input means for receiving a supply voltage, which is also applied to the logic switching means, wherein the supply voltage in put means is coupled to a measurement point in the logic switching means;
  a comparison means for outputting an error signal if the supply voltage drops below a reference value;
  a clock signal input means that receives a clock signal from a clock generating means; and
  a clock suppression means, which is coupled to the clock generating means and to the comparison means, that has a clock output means for outputting the clock signal, for suppressing or delaying the clock signal for a duration of at least one clock period if the error signal exists,
wherein at least one functional means in the logic switching means is coupled to the clock output means of the clock regulation apparatus.

16. The circuit arrangement as claimed in claim 15, further comprising at least one data storage means for storing the error signal.

17. The circuit arrangement as claimed in claim 15, further comprising at least one first functional means and a second functional means, which is independent of the first functional means, wherein a first clock regulation apparatus of the at least one clock regulation apparatus is coupled to the first functional means, and a second clock regulation apparatus of the at least one clock regulation apparatus is coupled to the second functional means.

18. The circuit arrangement as claimed in claim 17, wherein the clock generating means is coupled to the second clock regulation apparatus.

19. The circuit arrangement as claimed in claim 15, further comprising an operating controlling means for the clock regulation apparatus, wherein the clock generating means uses a control signal as a basis for generating clock signals having at least two different clock frequencies, and the clock regulation apparatus is operated only if the clock frequency provided by the clock generating means is greater than a reference frequency.

20. The circuit arrangement as claimed in claim 15, wherein the clock suppression means suppresses the clock signal for every, at least second clock period on a basis of the error signal.

* * * * *